United States Patent [19]

Prokop et al.

[11] 4,412,690

[45] Nov. 1, 1983

[54] SUSPENSION SYSTEM

[75] Inventors: B. Robert Prokop; Terry L. Trindle, both of Elkhart, Ind.

[73] Assignee: Kelsey-Hayes Co., Romulus, Mich.

[21] Appl. No.: 256,352

[22] Filed: Apr. 22, 1981

[51] Int. Cl.³ .............................................. B60G 5/04
[52] U.S. Cl. ..................................... 280/718; 267/56
[58] Field of Search ............... 280/718, 719, 720, 699, 280/682, 680; 267/54 R, 54 B, 54 E, 56

[56] References Cited

U.S. PATENT DOCUMENTS

| | | | |
|---|---|---|---|
| 2,986,389 | 5/1961 | Coonrod | 267/56 |
| 3,080,161 | 3/1963 | Felburn | 280/682 |
| 3,799,562 | 3/1974 | Hinchliff | 280/720 |

FOREIGN PATENT DOCUMENTS 25493 of 1906 United Kingdom ................. 267/56

Primary Examiner—Robert R. Song
Attorney, Agent, or Firm—Ralph J. Skinkiss; Ronald W. Wangerow; Steven L. Oberholtzer

[57] ABSTRACT

A leaf spring suspension system for supporting a vehicle is disclosed wherein one end of the spring is longitudinally moveable in load-transferring relationship with the vehicle at varying longitudinal positions along the vehicle frame. Thus, regardless of spring deflection, the axle remains equidistant between the longitudinal positions at which the vehicle's load is transferred to spring, thereby equalizing the load at each end of the spring.

4 Claims, 6 Drawing Figures

SUSPENSION SYSTEM

BACKGROUND OF THE INVENTION

1. Field of the Invention

The invention relates to an improved axle suspension system for vehicles, such as mobile homes, recreational vehicles, travel or utility trailers, or the like, and more particularly to such systems employing leaf springs resiliently supporting such vehicles.

2. Description of the Prior Art

Prior art vehicle suspension systems frequently include a pair of longitudinally-extending arcuate leaf springs secured to opposite ends of a laterally-extending axle. Typically, the vehicle's load is transferred to the ends of each leaf spring through a pair of longitudinally-spaced hangers fixed to the vehicle's frame.

Generally, one end of the leaf spring is restrained longitudinally and laterally by its hanger. Thus the longitudinal position at which the vehicle's load is transferred to the restrained end of the leaf spring is fixed to the vehicle frame. The opposite end of the leaf spring is also restrained laterally but is free to extend or retract longitudinally relative to a longitudinally fixed position at which the hanger engages the free end of the leaf spring. Thus in the prior art suspension systems, the longitudinal position at which the vehicle's load is transferred to the free end of leaf spring is longitudinally fixed relative to the leaf spring's restrained end.

When the leaf spring of such prior art suspension systems deflects, the axle moves closer to the load-transfer position at the free end of the leaf spring and farther from the load-transfer position at the restrained end of the leaf spring. As a result, the load distribution between the ends of the leaf spring varies as the leaf spring deflects.

SUMMARY OF THE INVENTION

According to the present invention, a vehicle suspension system is provided having a longitudinally-extending leaf spring pivotally attached at one end to the vehicle frame. The opposite or free end of the leaf spring slidingly engages a bracket plate such that the position of load transfer between the leaf spring's free end and the bracket plate is permitted to translate longitudinally.

Thus as the leaf spring deflects, the free end of the leaf spring may extend or retract longitudinally in sliding engagement with the bracket plate, contacting the plate at varying load-transferring positions along the length of the bracket plate. As a result, the axle remains equidistant between the leaf spring's fixed end and its free end. Thus the vehicle load is distributed equally between the fixed and free ends of the leaf spring regardless of leaf spring deflection.

DETAILED DESCRIPTION OF THE PREFERRED EMBODIMENT

Figure 1:
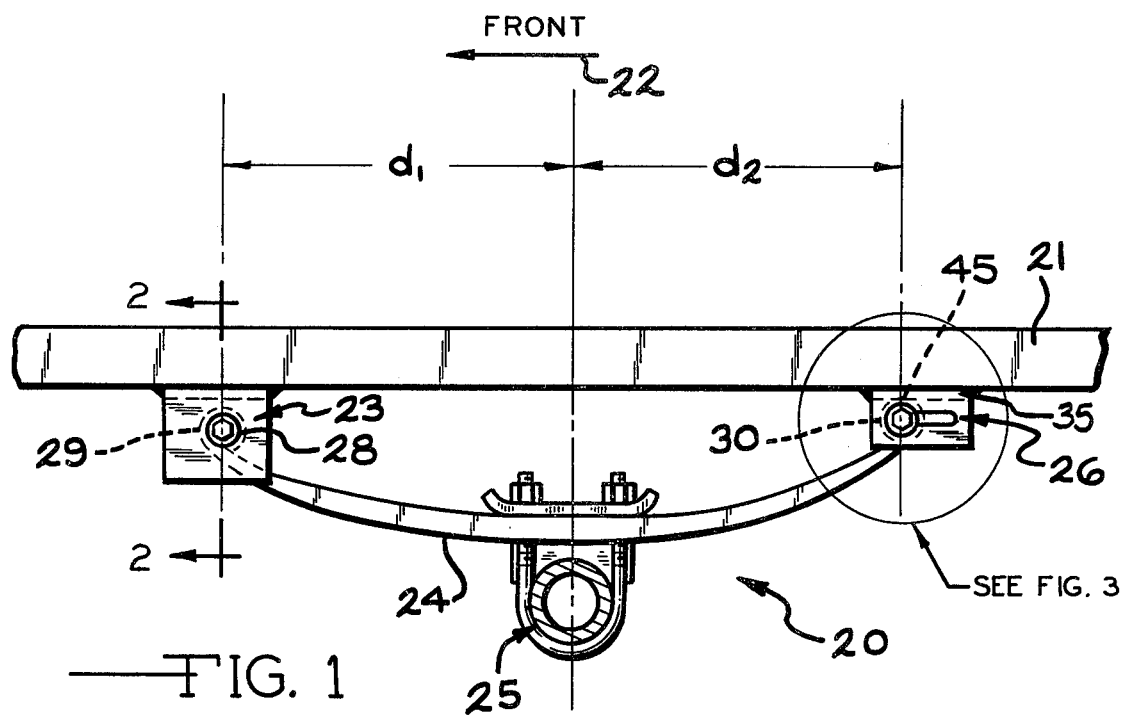
FIG. 1 is a left side elevation view of a single axle suspension system embodying the principles of the present invention.

Referring to the drawings, FIG. 1 illustrates a single axle suspension system 20 embodying the principles of the present invention. Suspension system 20 is preferably attached to the underside of vehicle frame member 21, the front of which is indicated by arrow 22. Suspension system 20 includes hanger 23, leaf spring 24, axle assembly 25, and bracket 26. Although in the drawings hanger 23 is preferably oriented toward the front of the vehicle, and bracket 26 is preferably oriented toward the rear of the vehicle, the invention is not limited to such orientation. The drawings depict suspension systems employing single element leaf springs, however the invention is equally applicable to suspensions using multiple element leaf springs.

Figure 2:
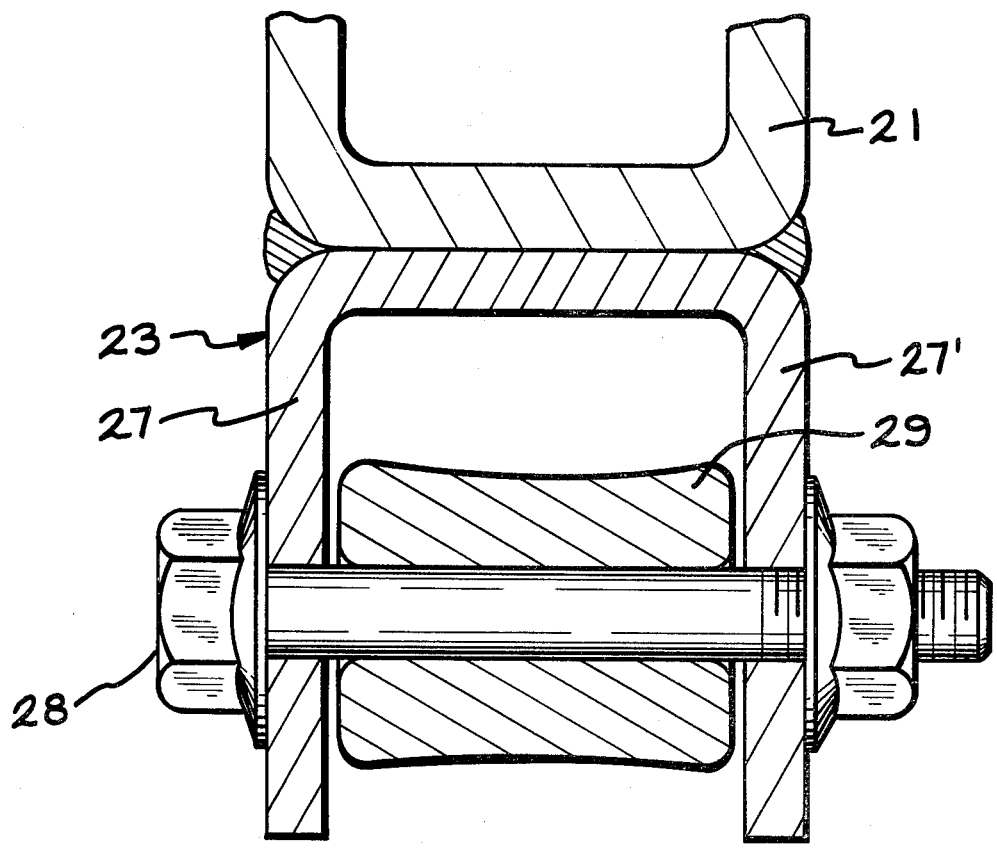
FIG. 2 is a cross-sectional view taken along line 2—2 of FIG. 1.

As is illustrated in FIG. 2, hanger 23 is generally U-shaped in lateral cross-section, having a pair of downwardly-extending hanger legs 27 and 27'. Hanger 23 is secured to vehicle frame member 21 by known methods such as welding. Leaf spring 24 preferably includes spring eye 29 which is received between front hanger legs 27 and 27'. Hanger bolt 28 protrudes through hanger legs 27 and 27' and through spring eye 29 to pivotally attach spring eye 29 to hanger 23.

Figure 4:
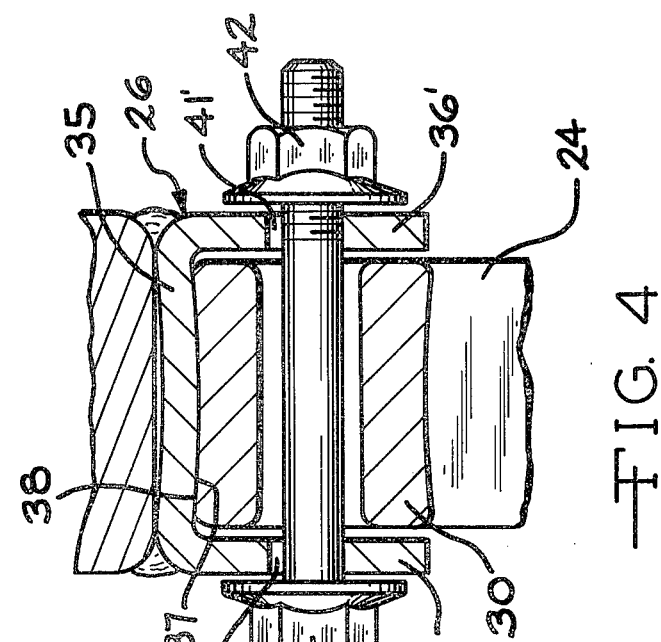
FIG. 4 is a cross-sectional view taken along line 4—4 of FIG. 3.
Figure 3:
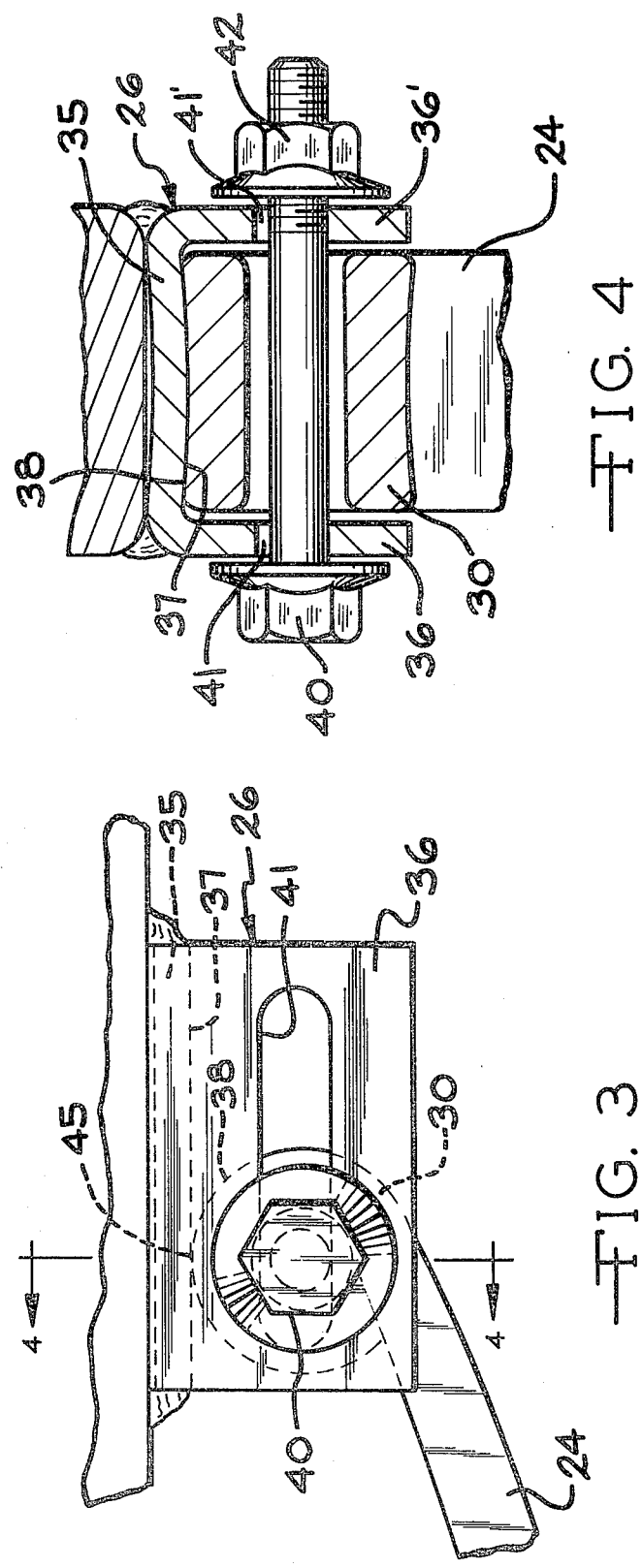
FIG. 3 is an enlarged view of the circled portion of FIG. 1.

Referring now to FIGS. 3 and 4, bracket 26 is generally U-shaped in lateral cross-section and includes bracket plate 35 and downwardly-extending bracket legs 36 and 36'. Spring eye 30 is received between bracket legs 36 and 36' and is free to slide longitudinally in load-transferring engagement with bracket plate 35.

The surface 37 of bracket plate 35 is preferably convex shaped to mate in a complementary relationship with the typically concave shape of outer surface 38 of spring eye 30, thereby providing for a substantially uniform load-transferring engagement across the lateral width of spring eye 30. The complementary engagement between spring eye 30 and bracket plate 35 tends to align spring eye 30 in a lateral location substantially equidistant between bracket legs 36 and 36'. Thus spring eye 30 tends to be laterally self-aligning with respect to bracket plate 35, thereby allowing spring eye 30 to freely extend or retract between bracket legs 36 or 36'.

Bracket bolt 40 extends through spring eye 30, protrudes through elongated openings 41 and 41' in bracket legs 36 and 36', respectively, and is held in place by locking nut 42. Bracket bolt 40 preferably fits loosely within spring eye 30 and elongated openings 41 and 41'. Bracket bolt 40 also fits loosely in the lateral direction with respect to bracket legs 36 and 36'. The loose fit of bracket bolt 40 allows spring eye 30 to slide freely in load-transferring engagement with bracket plate 35.

Bracket bolt 40 restrains spring eye 30 from vertical movement within bracket legs 36 and 36'. The restraining of such vertical movement, which is frequently referred to as vertical backlash, has been found to improve the vehicle's lateral stability. Bracket bolt 40 also maintains spring eye 30 between bracket legs 36 and 36' whenever the vehicle's wheel leaves the ground such as during tire changing or other vehicle servicing.

As is illustrated in FIGS. 1, 3 and 4, bracket plate 35 is preferably attached directly to vehicle frame member 21, thereby allowing spring eye 30 to be located vertically closer to vehicle frame member 21 than was typical in suspension systems of the prior art. Consequently, the vehicle may be lower to the road surface than in the prior art. Such lowered road clearance allows the usable height of the vehicle to be increased without exceeding overall vehicle height restrictions.

Suspension system 20, as described above, functions to distribute the vehicle's load equally between the ends of leaf spring 24 by maintaining axle assembly 25 in a longitudinal position substantially equidistant between the longitudinal positions at which the vehicle's load is transferred to leaf spring 24. Referring to FIG. 1, dimension $d_1$ is the longitudinal distance between hanger bolt 28 and the centerline of axle assembly 25. Similarly, dimension $d_2$ is the longitudinal distance between the centerline of axle assembly 25 and contact position 45, the longitudinal position at which spring eye 30 contacts bracket plate 35. As leaf spring 24 resiliently deflects, spring eye 30 slides forwardly or rearwardly, thereby varying the longitudinal location of contact position 45 at which the vehicle's load is transferred from frame member 21 and bracket plate 35 to spring eye 30. Also as leaf spring 24 deflects, axle assembly 25 shifts forwardly or rearwardly simultaneously with spring eye 30. As a result, dimensions $d_1$ and $d_2$ remain substantially equal, and the load on axle assembly 25 is evenly distributed between spring eye 29 and spring eye 30, regardless of the deflection of leaf spring 24.

Although the embodiment of the present invention depicted in FIGS. 1 through 4 is preferred, other alternate embodiments may be employed to obtain an even distribution of vehicle load between spring eye 29 and spring eye 30. An example of such an alternate embodiment would include a modification to bracket 26, whereby the vertical dimension of bracket legs 36 and 36' may be increased so that spring eye 30 does not engage bracket plate 35. In such an alternate embodiment, bracket bolt 40 slidingly engages elongated openings 41 and 41' in a load-transferring relationship. Thus, when leaf spring 24 deflects, spring eye 30 and bracket bolt 40 extend or retract, thereby varying the longitudinal location of the load-transferring engagement between bracket bolt 40 and the inside surface of elongated openings 41 and 41'. As a result, dimensions $d_1$ and $d_2$ remain substantially equal regardless of the deflection of leaf spring 24, and the load is evenly distributed between spring eye 29 and spring eye 30, as is described above with respect to the preferred embodiment.

Figure 5:
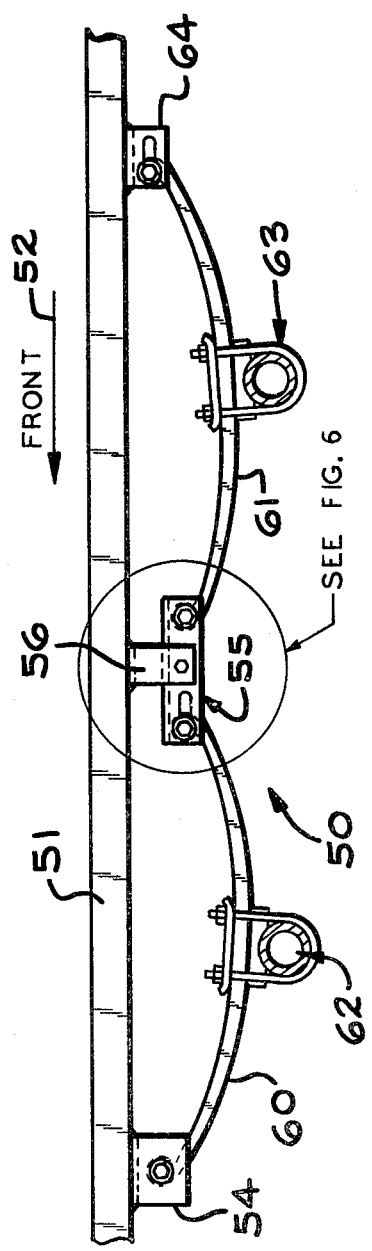
FIG. 5 is a left side elevation view of a tandem axle suspension system embodying the principles of the present invention.

FIG. 5 illustrates an application of the present invention to a vehicle having multiple axles. Although FIG. 5 shows a double axle suspension system, one skilled in the art will readily recognize that the invention may be employed on vehicles having any number of axles.

Suspension system 50 in FIG. 5 is preferably secured to the lower side of frame member 51 of a vehicle the front of which is preferably oriented in the direction indicated by front arrow 52. Although the orientation of the components of suspension system 50 with respect to the front of the vehicle as depicted in FIG. 5 is preferred, the invention is not limited to such orientation.

Suspension system 50 includes hanger 54, equalizer 55, center hanger 56, leaf springs 60 and 61, axle assemblies 62 and 63, and bracket 64. The configuration and function of hanger 54 and bracket 64 are preferably identical to those of hanger 23 and bracket 26, respectively, in FIGS. 1 through 4. Hanger 23 and bracket 26 are each described and discussed in detail in the above discussion of FIGS. 1 through 4.

Figure 6:
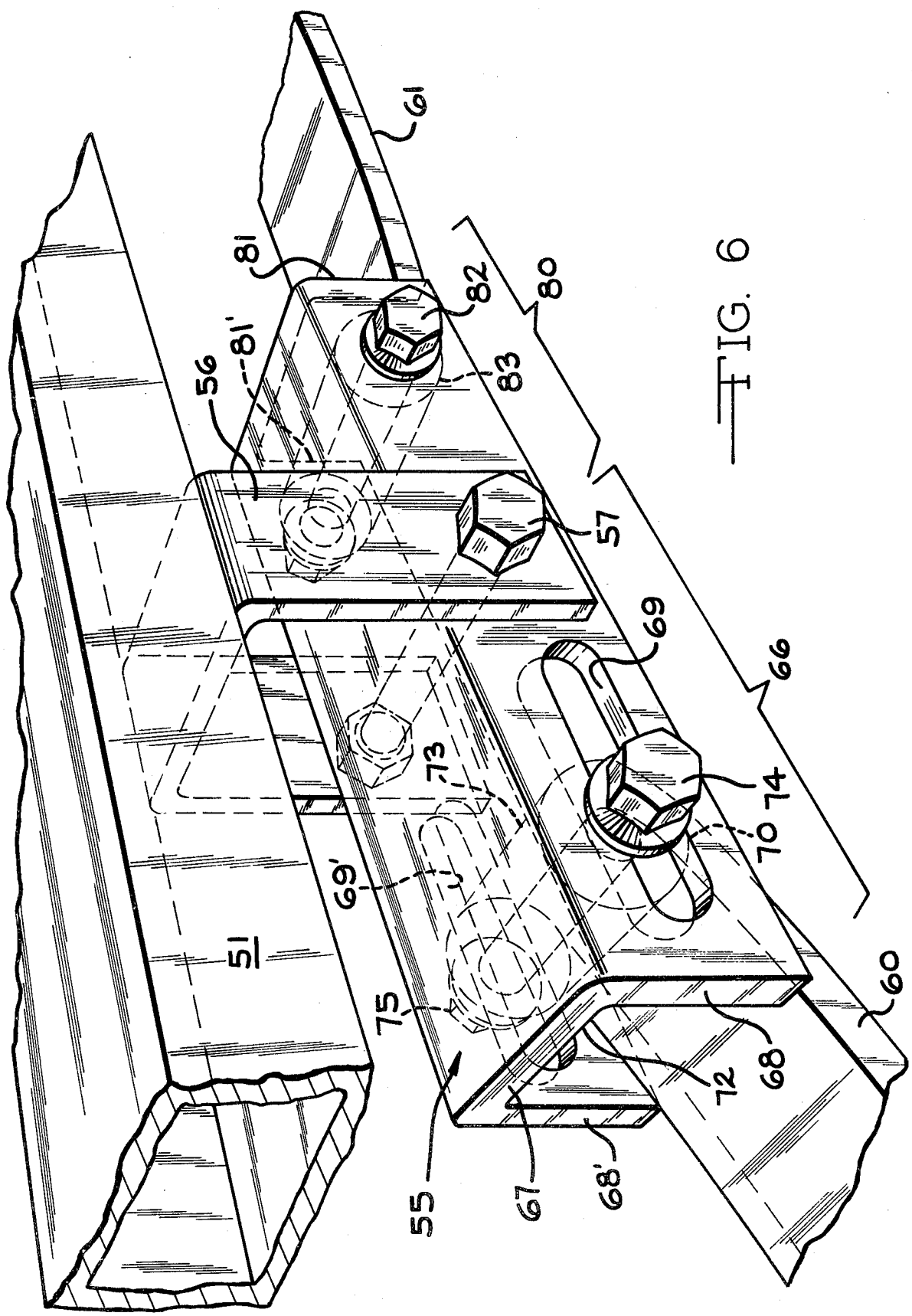
FIG. 6 is a perspective view of the circled portion of FIG. 5.

Referring to FIG. 6, center hanger bolt 57 pivotally attaches equalizer 55 to center hanger 56, which is secured to frame member 51 by any suitable method such as welding. As will become evident from the following description, bracket portion 66 and hanger portion 80 of equalizer 55 are similar in configuration and function to bracket 26 and hanger 23, respectively, in FIGS. 1 through 4.

Bracket portion 66 of equalizer 55 is generally U-shaped in its lateral cross-section and includes equalizer plate 67 connecting a pair of downwardly-extending equalizer legs 68 and 68'. Equalizer legs 68 and 68' have elongated apertures 69 and 69', respectively, therein. Spring eye 70 of leaf spring 40 is received between equalizer legs 68 and 68' and slidingly engages equalizer plate 67. Spring eye 70 is free to slide longitudinally, with respect to the vehicle, in load-transferring engagement with equalizer plate 67.

Equalizer plate 67 includes a preferably convex surface 72 engaging the typically concave outer surface 73 of spring eye 70. The complementary relationship of convex surface 72 with concave outer surface 73 provides for a uniform load-transferring engagement between spring eye 70 and equalizer plate 67. Furthermore, the complementary mating engagement of convex surface 72 with concave outer surface 73 serves a self-aligning function which tends to maintain spring eye 70 in a lateral position generally equidistant between equalizer legs 68 and 68'.

Bolt 74 protrudes through elongated apertures 69 and 69' as well as through spring eye 70 and fits loosely therein. Locking nut 75 retains bolt 74 in place but is not drawn tight against equalizer legs 68', thereby allowing bolt 74 to fit loosely in the lateral direction as well. The loose fit of bolt 74 minimizes the resistance to spring eye 70 freely extending or retracting in load-transferring engagement with equalizer plate 67. Bolt 74 also restrains spring eye 70 from vertical movement relative to equalizer 55, thereby improving the vehicle's stability as is discussed above with respect to bracket bolt 40 and spring eye 30 in FIGS. 1, 3 and 4.

Equalizer 55 also includes hanger portion 80 wherein leaf spring 61 is received between downwardly-extending hanger legs 81 and 81'. Bolt 82 engages hanger legs 81 and 81' and protrudes through spring eye 83 of leaf spring 61. Although pivotally connected to hanger legs 81 and 81', spring eye 83 is restrained longitudinally and laterally with respect to equalizer 55.

As leaf spring 60 resiliently deflects, spring eye 70 shifts forwardly or rearwardly to evenly distribute the load between hanger 54 and bracket portion 66 of equalizer 55. Leaf spring 61 functions similarly to slide forwardly or rearwardly within bracket 64, thereby evenly distributing the load between hanger portion 80, of equalizer 55, and bracket 64. Simultaneously, equalizer 55 is also free to pivot with respect to center hanger bolt 57, if necessary, to maintain an even load distribution between leaf springs 60 and 61 as well as between axle assemblies 62 and 63.

One skilled in the art can readily appreciate that the invention described above provides for a leaf spring suspension system capable of maintaining an even load distribution among any number of leaf springs in a multiple axle suspension system and an even load distribution between each end of each leaf spring.

The foregoing description represent merely exemplary embodiments of the present invention. Various changes may be made in the arrangements and details of production of the embodiments shown and described without departing from the spirit and scope of the present invention.

We claim:

1. In a vehicle suspension system including a spring means extending between a first and second vehicle attachment means and having axle means attached to said spring means between said first and second vehicle attachment means, the improvement wherein at least one of said vehicle attachment means includes a generally parallel pair of guides defining therebetween a load-transferring surface, wherein said pair of guides have corresponding slots therein extending generally parallel with said load-transferring surface, and pin means protruding from said spring means end and through said slots, said spring means having one end thereof in load-transferring slidable engagement with said load-transferring surface and thereby restrained between said pair of guides, said load-transferring surface and said spring means end having complementary lateral cross-sectional configurations.

2. In a suspension system for a vehicle resiliently supported by a longitudinally oriented leaf spring attached to a laterally oriented axle assembly, first and second connecting means for securing first and second opposite ends respectively of said leaf spring to the frame of said vehicle, the improvement wherein said second connecting means includes load-transferring means for receiving said leaf spring's second end in slidable load-transferring engagement wherein said load-transferring means and said leaf spring's second end have predetermined complementary lateral cross-sectional shapes, a pair of laterally-spaced legs extending downwardly with said leaf spring second end is positioned therebetween, each of said legs having a longitudinally elongated opening for slidably receiving therein a laterally-extending pin protruding from said leaf spring's second end, whereby the longitudinal position of said engagement between said leaf spring's second end and said load-transferring means varies as said leaf spring deflects.

3. Attachment means for connecting a suspension system to a vehicle having a longitudinally-extending vehicle frame, said suspension system having a longitudinally-extending spring means for resiliently supporting said vehicle, said attachment means comprising a generally horizontal plate attached to said vehicle frame, a pair of legs extending downwardly from said plate, said legs being adapted to receive an end of said spring means therebetween in slidable load-transferring engagement with said plate, said plate and said end of said spring means have complementary lateral cross-sectional shapes, each of said legs having an elongated opening therein, a pin member extending from said end of said spring means and being slidably carried by said elongated openings, whereby the longitudinal position of said load-transferring engagement of said end of said spring means with said plate varies in response to deflection of said spring means.

4. In a suspension system for a vehicle having first and second longitudinally extending leaf springs fixed to corresponding first and second laterally extending axles for resiliently supporting said vehicle, said first and second leaf springs each having first and second opposite ends thereon, a first attachment means for connecting said first end of said first leaf spring to said vehicle frame, equalizer means for connecting said second end of said first leaf spring and said first end of said second leaf spring to said vehicle frame, and second attachment means for connecting said second end of said second leaf spring to said vehicle frame, the improvement wherein said equalizer means includes a pair of laterally spaced first legs extending downwardly defining therebetween a first load transferring surface, each of said first legs having a longitudinally elongated first opening therein, said second end of said first leaf spring having a first pin means protruding laterally therefrom and through said first openings in said first legs, said second end of said first leaf spring slidingly engaging said first load transferring surface on said equalizer means, whereby the longitudinal position of said engagement of said second end of said first leaf spring with said first load transferring surface varies as said first leaf spring deflects, said second attachment means including a pair of laterally spaced legs extending downwardly and defining therebetween a second load transferring surface, each of said second legs having a longitudinally elongated second opening therein, said second end of said second leaf spring having a second pin means protruding laterally therefrom, and through said second openings in said second legs, said second end of said second leaf spring slidingly engaging said second load transferring surface on said second attachment means, whereby the longitudinal position of said engagement of said second end of said second leaf spring with said second load transferring surface varies as said second leaf spring deflects, said second end of said first leaf spring and said first load transferring surface having complementary lateral cross sectional shapes, and said second load transferring surface and said second end of said second leaf spring having complementary lateral cross sectional shapes.

* * * * *